United States Patent [19]

Kreiling et al.

[11] 4,293,610

[45] Oct. 6, 1981

[54] ELECTROSTATIC PRINTING MEDIUM

[75] Inventors: William H. Kreiling, Longmeadow, Mass.; Edward S. Jones, Bellvale, N.Y.

[73] Assignee: International Paper Company, New York, N.Y.

[21] Appl. No.: 99,006

[22] Filed: Nov. 30, 1979

Related U.S. Application Data

[62] Division of Ser. No. 24,584, Mar. 28, 1979.

[51] Int. Cl.³ .......... B32B 7/00

[52] U.S. Cl. .......... 428/246; 428/286; 428/462; 428/511; 430/62; 430/68; 430/69

[58] Field of Search .......... 260/29.7 W; 430/62, 430/68, 69; 428/539, 511, 328, 286, 246, 462

[56] References Cited

U.S. PATENT DOCUMENTS

| | | | |
|---|---|---|---|
| 3,672,988 | 6/1972 | Tamai et al. | 427/121 |
| 3,708,289 | 1/1973 | Timmerman et al. | 430/62 |
| 3,784,401 | 1/1974 | Wheelock | 427/377 |
| 3,880,793 | 4/1975 | Nakayama | 260/29.7 W |
| 3,898,185 | 8/1975 | Philp et al. | 252/511 |
| 3,900,319 | 8/1975 | Miller | 430/62 |
| 4,081,584 | 3/1978 | Akiyama et al. | 427/121 |
| 4,120,720 | 11/1978 | Gross | 430/62 |
| 4,148,639 | 4/1979 | Sinkovitz et al. | 430/62 |

OTHER PUBLICATIONS

Cymel 300-301, Technical Bulletin, American Cyanamid Co., Industrial Chem. and Plastics Div., Wayne, N.J.

*Primary Examiner*—Ronald H. Smith

*Assistant Examiner*—Richard Bueker

*Attorney, Agent, or Firm*—James F. Haley, Jr.

[57] ABSTRACT

An improved aqueous process for making a conductive medium for electrostatic printing and the conductive medium therefrom, the process comprising applying to one side of a high density basestock a partially insolubilizable aqueous conductive latex precoat, preferably ranging in coat weight from 0.5 to 1.0 pounds per 3000 $ft^2$, the insolubilization of the conductive latex resulting from a partial insolubilization of the major conductive component of the latex; applying to the other side of the basestock a first aqueous low-resistance conductive precoat preferably having a coat weight of about 2 pounds per 3000 $ft^2$; partially insolubilizing the conductive latex precoat; applying to the partially insolubilized latex precoat an aqueous dielectric coating preferably ranging in coat weight from 4.5 to 6.5 pounds per 3000 $ft^2$; and applying to the first low-resistance precoat a second aqueous low-resistance conductive coating preferably ranging in coat weight from 0.5 to 1.5 pounds per 3000 $ft^2$. The conductive paper comprises on the one side of a high density basestock a partially insolubilized aqueous conductive latex layer, preferably ranging in weight from 0.5 to 1.0 pounds per 3000 $ft^2$, the insolubilization of the conductive latex resulting from a partial insolubilization of the major conductive component of the latex and on top thereof a dielectric layer preferably ranging in weight from 4.5 to 6.5 pounds per 3000 $ft^2$ and comprises on the other side of the basestock at least two aqueous conductive layers, preferably having a total weight of from about 2.5 to 3.5 pounds per 3000 $ft^2$.

16 Claims, 1 Drawing Figure

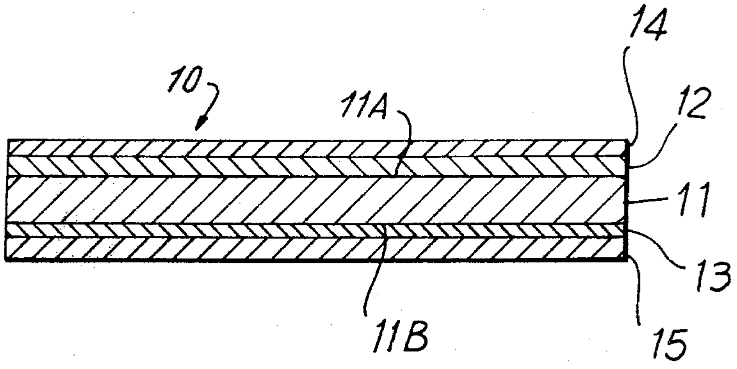
10
11A
14
12
11
13
11B
15

ELECTROSTATIC PRINTING MEDIUM

This is a division of application Ser. No. 24,584, filed Mar. 28, 1979.

BACKGROUND OF THE INVENTION

This invention relates to an improved process for making a conductive medium for electrostatic printing and the conductive medium therefrom. More particularly, the invention is directed to an improved aqueous-based process for making a dielectric-coated medium that affords excellent imaging characteristics in electrostatic printing applications.

Electrostatic printing media generally comprise a dielectric layer on an electrically conductive base. The dielectric layer of this combination permits retention of a latent electrostatic image on its surface until the image is developed and fixed by toner. Further, the electrically conductive base is usually constituted to dissipate any stray electrical charges so that the resulting prints will have a non-interfering background. Preferably, a dielectric printing medium would be fabricated by applying the dielectric coating directly to a paper base sheet. However, the electric conductivity of conventional cellulosic basestock varies significantly, low conductivity of basestock producing poor ultimate image reloution and increasing background contamination of the resultant print. Accordingly, it has become conventional practice in the art to pretreat cellulosic base sheets with conductive material before applying the dielectric layer. This pretreatment improves and standardizes the base sheet's electrical conductivity, conductivity being the inverse of resisitivity. Conductive pretreatments may be applied in the form of base sheet impregnations or sheet subcoatings. Conductive materials useful for such pretreatment and their methods of application to the base sheet are well-known in the art. For example, U.S. Pat. No. 3,385,730 discloses an aqueous pretreatment composition of glycerine and ammonium chloride to standardize and enhance base sheet conductivity. Other such compositions and processes are disclosed for example, in U.S. Pat. Nos. 3,075,859; 3,216,853; 3,348,970; 3,493,427; 3,520,771; 3,629,000; 3,639,640 and 3,935,335.

The conductive materials useful in the above-described processes are usually water soluble. Moreover, they retain their water solubility after precoating of the base sheet. Unfortunately, it is difficult to apply water soluble dielectric layers to such water soluble electrically conductive precoats or impregnated sheets without diffusion of some conductive material into the dielectric layer. Yet, conductive contamination of the dielectric layer substantially destroys the dielectric layer's required insulating character and degrades the ultimate printing performance of the medium. Therefore, many prior art dielectric coating processes were carried out in organic solvents to avoid dissolution of the conductive aqueous precoats and the resultant conductive contamination of the dielectric layer. However, organic solvents are more expensive than aqueous ones. They are also more inflammable and hazardous to personnel and the environment. It would therefore be more preferred to use aqueous-based dielectric compositions in any commercial process for making conductive paper. Examples of some available aqueous-based dielectric compositions are disclosed in U.S. Pat. Nos. 3,216,835; 3,348,970; 3,629,000; 3,847,661 and 3,920,880.

Unfortunately, most prior attempts to apply water-based dielectric layers directly on top of aqueous conductive precoats have been unsuccessful in avoiding substantial conductive contamination of the dielectric layer and the other problems related to unfavorable interaction between the two functionally disparate but like soluble layers. E.g., U.S. Pat. No. 3,759,774, column 2, lines 22–37 and U.S. Pat. No. 3,847,661, column 1, lines 23–32.

Several attempts have been made to avoid this debilitating layer interaction through use of a separate intermediate barrier layer to separate the surface of the conductive precoat or impregnation from the dielectric layer. Preferably, the intermediate layer is chosen to be compatible with and receptive to both the conductive layer and the dielectric layer and to provide a good bonding surface between them. One such protective or barrier layer, comprising oxidized starch and calcium carbonate, is disclosed in U.S. Pat. No. 3,759,744. Although this barrier layer substantially prevents conductive contamination of the dielectric layer, its use and process of its application is economically disadvantaged by the additional equipment and material needed to effect intermediate layer formation.

Recognizing this disadvantage in the former separate barrier layer, the coating process of U.S. Pat. No. 3,956,571 relies for its conductive layer-dielectric layer separation on an incidentally formed migration-prevention layer. This incidental layer is formed between the conductive layer and the dielectric layer by an ionic reaction between anionic components of the dielectric composition and cationic components of the conductive precoat. The resultant intermediate layer apparently prevents the migration of the aqueous conductive components into the aqueous dielectric layer.

Also avoiding the disadvantages inherent in separate barrier layers are the processes described in U.S. Pat. Nos. 3,709,728 and 3,672,988. The former is characterized by two distinct applications of a special aqueous dielectric dispersion to the base sheet. Each of the dielectric layers formed in this process becomes water insoluble upon heat aging. More usually, an insolbuilizer, such as a water-soluble melamine formaldehyde resin, is included in the dielectric dispersion to speed the insolubilization and improve the water insolubility of the composite dielectric layer. Subsequent to the water insolubilization of the two dielectric layers, the base sheet is rendered more conductive by impregnation with an aqueous solution of a conductive salt from the side opposite to the dielectric coating. Although this process avoids dielectric layer contamination, second step backside impregnation is not as effective as initial conductive layer precoating or impregnation for producing the desired electrically-conductive substrate preferred for optimum electrostatic printing. In addition, the necessity to use two separate dielectric layers in this process disfavors it economically since the cost of dielectric material is the most substantial factor in the unit cost of the conductive medium.

The latter process is characterized by the use of an aqueous colloidal alumina-resin composition to increase the electrical conductivity of the base sheet. The resin component of this composition dries to form a water-insoluble film that is amenable to subsequent overcoating with conventional aqueous dielectric compositions. Usually, water-soluble polymers or aqueous emulsions of resins capable of forming water-insoluble cured films, such as styrene/butadiene copolymer latexes and butadiene/methylmethacrylate copolymer latexes, are employed as the resin or insolubilizing component in such compositions. On disadvantage of this process is that the alumina-resin layer on the underside of the paper, i.e. that not overcoated with the dielectric layer, displays insufficient hold-out to prevent carrier solvents of conventional developing agents from permeating into the interior of the paper. Such permeation results in inferior electrostatic printing, both in terms of image development and handling characteristics. Another disadvantage is that a resin component in addition to the alumina, the major conductive component of the low-resistance layer, must be employed to attain the required water insolubility of the conductive subcoat.

STATEMENT OF THE INVENTION

Accordingly, it is an object of this invention to provide an improved aqueous-based process for making a conductive medium for electrostatic printing.

It is a further object of this invention to provide an improved aqueous based process for making a conductive medium for electrostatic printing wherein interaction between an aqueous-based conductive subcoat and an aqueous-based dielectric topcoat is prevented without the use of an external barrier layer.

It is another object of this invention to provide an improved aqueous-based process for making a conductive medium for electrostatic printing wherein a cellulosic base sheet is subcoated with an aqueous-conductive composition and topcoated on one side with an aqueous dielectric composition.

It is another object of this invention to provide an improved aqueous-based process for making a conductive paper for electrostatic printing wherein interaction between aqueous-based conductive subcoats and aqueous-based dielectric top-coats is prevented by partial insolubilization of the major conductive component of the subcoat itself.

It is still another object of this invention to provide a novel conductive medium for electrostatic printing which affords excellent imaging, development and handling in electrostatic printing applications.

It is a further object of this invention to provide a novel conductive medium for electrostatic printing applications which is produced from low cost and readily available materials in a simple, easy and economical process.

These and other additional objects and advantages of this invention, apparent from the detailed description and claims which follow, are accomplished by a process for making a conductive medium for electrostatic printing comprising applying to one side of a high density basestock an insolubilizable aqueous conductive latex precoat, the insolubilization of the conductive latex resulting from partial insolubilization of the major conductive component of the latex; applying to the other side of the basestock a first aqueous low-resistance precoat; partially insolubilizing the conductive latex precoat; applying to the partially insolubilized conductive latex precoat an aqueous dielectric coating; and applying to the first low-resistance precoat a second aqueous low-resistance coating.

The novel conductive medium of this invention comprises on one side of a high density basestock a partially insolubilized aqueous conductive latex precoat, the insolubilization resulting from a partial insolubilization of the major conductive component of the latex; and on top thereof a dielectric coating and comprises on the other side of the basestock at least two low-resistance coatings.

BREIF DESCRIPTION OF THE DRAWINGS

The figure is an enlarged cross-sectional view of a conductive medium of this invention. It illustrates the various component layers which in combination comprise the conductive medium for electrostatic printing of this invention. The illustrated component layers are not drawn to scale.

DETAILED DESCRIPTION OF THE INVENTION

Referring to FIG. 1, an enlarged cross-sectional view of a conductive medium 10 of this invention is depicted, no attempt having been made to illustrate the component layers of such medium to scale. Medium 10 has as a substrate or base sheet, a high density basestock 11. Such basestocks are well known in the art. They may be metallic, non-metallic or metallized and be selected from metal, metallic foil, paper, non-woven fabrics, wood, plastic films, cloth and the like. The selection of such base sheet from these well-known classes forms no part of this invention. Preferably, the basestock is paper, more usually being a high density, white, well formed, smooth kraft paper having reasonably good sizing.

Medium 10 further comprises on side 11A of the high density basestock 11, a partially insolubilized aqueous conductive latex precoat 12, the insolubilization resulting from a partial insolubilization of the major conductive component of the latex; and on top thereof a dielectric coating 14; and on the other side 11B of the basestick 11 at least two low-resistance coatings, 13 and 15.

The conductive medium of this invention is preferably made by a process comprising applying to side 11A of high density basestock 11 an insolubilizable aqueous conductive latex precoat 12, the insolubilization of the conductive latex resulting from a partial insolubilization of the major conductive component of the latex; applying to the other side 11B of the basestock 11 a first aqueous low-resistance precoat 13; partially insolubilizing the conductive latex precoat; applying to the partially insolubilized conductive latex precoat an aqueous dielectric coating 14; and applying to the first low-resistance precoat 13 a second aqueous low-resistance coating 15.

It should be understood that the application of these various layers may be done in a single application or result from a combination of several separate applications. For example, the latex subcoat may be applied in one layer or the subcoat may result from several applications of the latex. Application of the respective layers is done by conventional techniques, such as trailing blade, size press, and metering size press. It is also to be understood that the partial insolubilization of the conductive latex precoat may be effected at any time between its application to the basestock and the application of the dielectric coating thereon.

The absolute and relative thicknesses of each of material layers 12, 13, 14, and 15, are determined in large measure by the specific properties sought in the conductive medium. Those of skill in the art recognize that adjustments in film properties may be made by appropriate selection of the thickness of each component layer, as measured by pounds of coating per area of paper coated. Preferably, the conductive latex precoat 12 ranges in coat weight from about 0.3 to 5.0 pounds/3000 $ft^2$, the dielectric layer 14 from about 2.0 to 10.0 pounds/3000 $ft^2$ and the total coat weight of the two low-resistance coatings 13 and 15 between about 1.0 to 10.0 pounds/3000 $ft^2$. More preferably, these latter coatings are applied such that the outer coating 15 has a coat weight ranging from about 0.3 to 5.0 pounds/3000 $ft^2$ and the innermost coating 13 has a coat weight ranging from about 0.3 to 5.0 pounds/3000 $ft^2$. These preferred coatings may be reduced or increased as the specific properties desired in the conductive medium dictate.

In the most preferred embodiment of the conductive medium of this invention, the conductive latex precoat 12 ranges in coat weight from about 0.5 to 1.0 pounds/3000 $ft^2$, the dielectric layer 14 from about 4.5 to 6.5 pounds/3000 $ft^2$ and the total coat weight of the two low-resistance coatings 13 and 15 between about 2.5 to 3.5 pounds/3000 $ft^2$; these latter coatings being applied such that the outer coating 15 has a coat weight ranging from about 0.5 to 1.5 pounds/3000 $ft^2$ and the innermost coating 13 has a coat weight ranging from 0.5 to 1.5 pounds/3000 $ft^2$.

The partially insolubilizable aqueous conductive latexes useful in the process and conductive medium of this invention are aqueous soluble or dispersible carboxylated polymers. Although the preparation of these polymers forms no part of this invention, the polymers are usually prepared by interpolymerizing one or more carboxylic-containing monomers with other polymer latexes, for example, the butadiene-based polymer latexes well-known in the art. These latexes are obtained by polymerizing 29.5 to 99.5 percent by weight butadiene, with up to about 70 percent by weight styrene and preferably up to 50 percent by weight acrylonitrite. In addition to these monomers, up to 40 percent by weight of one or more other polymerizable comonomers may also be used. Typically, these comonomers will be vinylidene monomers having at least one terminal vinyl group:

$$CH_2{=}C{<}$$

Examples of such compounds include αmethylstyrene, chlorostyrene, αolefins, vinylhalides, αβ-unsaturated nitriles, alkylvinyl ethers, esters of αβ-olefinically unsaturated carboxylic acids such as methylacrylate, amylacrylate, methylmethacrylate, haloalkylacrylates, vinyl ketones, vinyl pyridine, αβ-olefinically unsaturated amides and the like as are known to those of skill in the art.

The carboxyl functionality necessary for the conductive latex of this invention is chemically bound to the butadiene-based polymer by polymerizing one or more αβ- olefinically unsaturated carboxylic acid monomers with the butadiene and other monomers which may be present as described above. Such acid monomers include acrylic acid, methacrylic acid, chloroacrylic acid, sorbic acid, cinnamic acid, maleic acid, glutamic acid and the like. Any of the numerous polymerization techniques known in the art may be used to form such conductive latexes, the actual synthesis of the latex forming no part of this invention.

To be useful in this invention the particular partially insolubilizable aqueous conductive latex used must be compatible with the dielectric coating and the base sheet. Further, after its application to the base sheet and partial insolubilization it is desirable that the conductive latex reduce the resistivity of the surface of the base sheet by two decades, i.e., to about $1\times10^{10}$ ohms/square at 50% relative humidity. Surface resistivity measurements may be performed using those procedures well-known in the art. E.g., ASTM D 257-61 using a General Radiotype 1230-A Electrometer as disclosed in U.S. Pat. No. 3,709,729 or the Keithley Electrometer. The insolubilizable conductive latex empolyed in accordance with this invention must also be rewettable by the dielectric component during top coat application but substantially insoluble therein. Most preferably, a carboxylated styrene-butadiene conductive latex is used in the process and medium of this invention.

It is important to note that the carboxylic components of the latex are the major conductive portions thereof, i.e., they provide the needed resistivity reduction to the surface of the base sheet. In addition, these carboxylic components also function to provide the insolubilizing sites in the latex. Accordingly, the insolubilization process of this invention must be carefully controlled. The number of hydrophilic carboxylic functionalities tied up during insolubilization and film formation must prevent the coating from resolubilizing into subsequently applied aqueous based layers. Yet, the number tied up must be insufficient to preclude that desired reduction of resistivity in the base sheet surface from which depends the ultimate behavior of the resultant electrostatic printing medium.

The partial insolubilization of the latex of this invention results from cross-linking of the latex or a film formation that ties up some of the hydrophilic carboxylic groups. While this film formation may be effected during drying, drying at raised temperatures, or other heat treatments, it is more preferable to employ one or more amine cross-linking agents such as are well-known in the art. Such amine cross-linking agents include urea formaldehydes, melamine formaldehydes and other like amine compounds. Most preferably, hexamethoxy methylmelamine and a small amount of an acid catalyst are employed to effect rapid film formation and partial insolubilization of the latex. In this preferred embodiment, such acid catalyst is usually buffered with a volatile alkaline material so as to be active only in the dry state rather than in the buffered liquid state.

Preferably, the latter acid catalyst/alkaline buffer combination is used in an amount equal to about 20% by weight of the dry latex to effect sufficient insolubilization without destroying the conductivity of the resulting partially insolubilized layer. However, it should be understood that adjustments in these proportions may be made to afford different conductive or solubility properties of the latex or to accommodate other cross-linking agents.

It is a further unexpected attribute of this invention that the reduction in surface resistivity (resistance being the reciprocal of conductance) of the base sheet surface beneath the dielectric coating (wire side) need only be to about $1\times10^{10}$ ohms/square at 50% relative humidity to afford good print density in the ultimate electrostatic printing medium. Formerly, it was the practice of the art to reduce the surface resistivity of the base sheet surface beneath the dielectric coating to $1\times10^7$ to $1\times10^8$ ohms/square at 50% relative humidity. While not wishing to be bound by theory, it is believed that the higher resistivity allowed by the process of this invention may result from the use of a conductive film on the reverse or felt side of the base sheet, this film having a surface resistivity of $1\times10^7$ to $1\times10^8$ ohms/square at 50% relative humidity and more preferably $1\times10^7$ ohms/square at 50% relative humidity.

In accordance with the process of this invention the conductive film on the reverse or felt side of the basestock is preferably a combination of two separately applied coatings. Each coating may be separately selected from low-resisitance coatings well-known in the art. For example, corn starch/salt mixtures, protein-salt mixtures, quaternary amines such as polyvinyl benzyl trimethyl ammonium chloride, polydimethyl diallyl ammonium chloride and polyepichlorohydrin quaternized trimethyl amine and mixtures thereof may be usefully employed in the conductive layers of this invention. Alcohols such as ethanol, methanol and butanol, alone or in various mixtures may also be usefully employed in the conductive mixes to improve coating penetration of the base sheet and to increase volume conductivity of the final medium. Other components such as silicone binders may also be included in the conductive coatings. Similar or different coatings may be employed to build up the desired low-resistance layer on the felt side of the basestock. Most preferably, a 25% (by dry weight) salt —75% (by dry weight) starch mixture is used to effect the first or lower low-resistance layer and a quaternary amine, butanol and a silicone agent are used to effect the final or upper low-resistance layer of the conductive medium of this invention.

The dielectric or recording layer as employed in this invention should be able to accept a chare of 60-300 volts for a time interval of 6-25 microseconds and have a surface resistivity of about $1\times10^{14}$ ohms/square at 50% relative humidity. Preferably, the dielectric layer of this invention consists of a pgiment, such as clay, calcium carbonate, zince oxide, titanium dioxide, cadmium sulfate, barium sulfate, and combinations thereof, and an aqueous dielectric resin binder such as butadiene-styrene copolymers with acrylic acid, alkali sensitive butadiene-styrene, styrene acrylate copolymer and polyvinyl acetate. These dielectric compositions preferably also include other components for tack reduction, sheer resistance, and other desired features. For example, these other additives include pigments such as zinc oxide, magnesium oxide, and titanium dioxide, plasticizers such as discrete styrene particles, and other known additives such as diatomaceous earth. For example, in one preferred embodiment of this invention the dielectric coating formulation may consist of 5-10 parts of diatomaceous earth, 15-25 parts titanium dioxide, 20-50 parts discrete styrene particles, 40-60 parts dielectric resin and 0.2-1.0 parts polyvinyl acetate.

In order to describe the present invention so that it may be more clearly understood, the following example is set forth. This example is primarily for the purposes of illustration and any specific enumeration therein should not be construed as a limitation on the concept of this invention.

EXAMPLE

A bleached softwood kraft paper was prepared in a conventional manner to a basis weight of 38 pounds/3000 square feet. The surface resistivity of this paper was $1\times10^{12}$ ohms/square at 50% relative humidity.

A partially insolubilizable aqueous conductive latex was prepared by combining (by weight) 33.6 parts water, 16.8 parts ethanol, 28 parts hexamethoxymethylmelamine (80% solids) and 295 parts carboxylated styrene butadiene (38% solids) in a high shear mixer such as a Kady mill. These ingredients were disperesed thoroughly. Melamine formaldehyde was adjusted with ammonium hydroxide to a pH of about 7.5 and 0.54 parts (40% solids) of the buffered catalyst was added to the prior mixture and mixed thoroughly therewith. The resultant mixture had a viscosity of 384/187 cps (20/100 rpm) and a pH of 8.2.

312.5 parts of corn starch (32% solids) was slurried in 37.4 parts of water and the pH adjusted with soda ash to 7.0. The starch was converted with alphamase (1% solids), the enzyme being present in an amount of 15 ml per 100 pounds of starch and heated at 170° F. for 20 minutes. Enzyme kill was accomplished by raising the temperature of the slurry to 210° F. for 15 minutes. The first low-resistance coating material was prepared by mixing the starch slurry with 33.3 parts of sodium chloride. The resultant mixture had a viscosity of 550/440 cps (20/100 rpm) and a pH of 6.0.

A dielectric coating composition was prepared by blending two separately prepared mixtures. The first was prepared by dispersing, as for example in a high shear mixer such as an Abbey mixer, 50.0 parts (by weight) titanium dioxide, 17.1 parts polyvinyl acetate (17.1% solids), 16.1 parts water and 8.5 parts diatomaceous earth. The other mixture was prepared by dispersing 198.9 parts plastic pigment (49.0% solids), adjusted to pH 6.0 with ammonium hydroxide and 291.7 parts styrene butadiene dielectric resin (49.7% solids) adjusted to pH 6.0 with ammonium hydroxide. 75.5 parts of the first mixture (66.1% solids) was then combined with the second mixture and stirred vigorously. The resulting mixture had a viscosity of 220/136 cps (20/100 rpm) and a pH of 7.1.

The felt side conductive composition was prepared by diluting 150 parts polydimethyldiallyl ammonium chloride (40.0% solids) with 350 parts water and adding 2.5 parts n-butanol and 2.5 parts of a silicone agent. The resulting mixture had a viscosity of 100/132 cps (20/100 rpm) and a pH of 6.1.

To prepare the conductive medium described in this invention, the above prepared partially insolubilizable aqueous conductive latex—acid catalyst mixture was applied to the wire side of the kraft paper in a coat weight of 0.9 pounds/3000 square feet at 5.0% moisture using a conventional size press. To the felt side of that paper the above prepared first low-resistance coating material was similarly applied in a coat weight of 1.9 pounds/3000 square feet at 4.4% moisture.

After partially insolubilizing the conductive latex by drying the kraft paper on a paper machine at a temperature of 180° F., the wire side of the basestock displayed a surface resistivity of $1\times10^{10}$ ohms/square at 50% relative humidity and the felt side a surface resistivity of $1\times10^9$ ohms/square at 50% relative humidity.

Subsequent to these applications, the above prepared dielectric component was applied as a second or top coat to the wire side of the paper in a coat weight of 5.0 pounds/3000 square feet at 5.0% moisture and thereafter the above prepared second low-resistant component was applied to the felt side of the paper as a second or top coat in a coat weight of 1.0 pounds/3000 square feet at 5.2% moisture. The wire side of the dielectic medium now displayed a surface resistivity of $5\times10^{12}$ ohms/square at 50% relative humidity and the felt side a surface resistivity of $1.0\times10^8$ ohms/square at 50% relative humidity.

The above prepared conductive paper was employed in a conventional high speed electrostatic printing device and displayed excellent image density, fine print resolution and good print background.

While we have hereinbefore presented a number of embodiments of our invention, it is apparent that our basic construction and process can be altered to provide other embodiments which utilize our invention. Thus, it will be appreciated that the scope of our invention is to be defined by the claims appended hereto rather than the specific embodiments which have been presented hereinbefore by way of example.

I claim:

1. An improved conductive medium for electrostatic printing comprising on a first side of a high density basestock a partially insolubilized aqueous conductive latex precoat comprising an interpolymer of a butadiene-based polymer latex and a $\alpha\beta$-olefinically unsaturated carboxylic acid monomer, the insolubilization of the conductive latex resulting from partial insolubilization of the major conductive component of the latex, the extent of said partial insolubilization being controlled so as to provide to said first side of the basestock a surface resistivity of about $1\times10^{10}$ ohm/square at 50% relative humidity, and on top thereof a dielectric coating and comprising on the other side of the high density basestock at least two low-resistance coatings.

2. The medium of claim 1 wherein the basestock is selected from the group consisting of metal, metallic foil, paper, non-woven fabrics, wood, plastic film and cloth.

3. The medium of claim 1 wherein the basestock is paper.

4. The medium of claim 1 wherein the $\alpha\beta$-olefinically unsaturated carboxylic acid monomer is selected from the group consisting of acrylic acid, methacrylic acid, $\alpha$chloroacrylic acid, sorbic acid, cinnamic acid and maleic acid.

5. The medium of claim 1 wherein the partially insolubilized conductive latex is carboxylated styrene butadiene.

6. The medium of claim 1 wherein the partial insolubilization of the aqueous conductive latex is effected by an amine cross-linking agent selected from the group consisting of urea formaldehyde, melamine formaldehyde, and hexamethoxymethyl melamine.

7. The medium of claim 1 wherein the dielectric coating comprises a resin binder and a pigment selected from the group consisting of zinc oxide, titanium dioxide, cadmium sulfate, barium sulfate and mixtures thereof.

8. The medium of claim 7 wherein the dielectric coating also includes diatomaceous earth.

9. The medium of claim 7 wherein the resin binder is selected from the group consisting of butadiene-styrene copolymers with acrylic acid; alkali-sensitive butadiene-styrene; styrene-acrylate copolymers and vinyl acetate.

10. The medium of claim 1 wherein each of the low-resistance coatings is selected separately from the group consisting of salt/starch mixtures, protein/salt mixtures and quaternary amines.

11. The medium of claim 10 wherein each of the low-resistance coatings also includes alcohols selected from the group consisting of ethanol, methanol, butanol and mixtures thereof and silicone binders.

12. The medium of claim 10 wherein the low-resistance coating adjacent the other side of the basestock is a salt/starch mixture and the other low-resistance coating is a quaternary amine.

13. The medium of claim 1 wherein the partially insolubilized aqueous conductive latex precoat ranges in coat weight from about 0.3 to 5.0 pounds/3000 square feet; the dielectric coating ranges in coat weight from about 2.0 to 10.0 pounds/3000 square feet; and the low-resistance coatings have a total coat weight of from about 1.0 to 10.0 pounds/3000 square feet.

14. The medium of claim 13 wherein the low-resistance coating adjacent the other side of the basestock ranges in coat weight from about 0.3 to 5.0 pounds/3000 square feet and the other low-resistance coating ranges in coat weight from about 0.3 to 5.0 pounds/3000 square feet.

15. The medium of claim 1 wherein the partially insolubilized aqueous conductive latex precoat ranges in coat weight from about 0.5 to 2.5 pounds/3000 square feet; the dielectric coating ranges in coat weight from about 4.5 to 6.5 pounds/square feet and the low-resistance coatings have a total weight of from about 2.5 to 3.5 pounds/3000 square feet.

16. The medium of claim 15 wherein the low-resistance coating adjacent the other side of the basestock ranges in coat weight from about 0.5 to 2.5 pounds/3000 square feet and the other low-resistance coating ranges in coat weight from about 0.5 to 2.5 pounds/3000 square feet.

* * * * *